INVENTOR
JOHN P. GLASS
BY John H. A. Earley
ATTORNEY

Oct. 27, 1970     J. P. GLASS     3,536,519

WHISKERS

Filed Aug. 31, 1967     2 Sheets-Sheet 2

INVENTOR
JOHN P. GLASS
BY
*John F. A. Earley*
ATTORNEY

United States Patent Office 3,536,519
Patented Oct. 27, 1970

3,536,519
WHISKERS
John P. Glass, Ardmore, Pa. (% Cava Industries,
79 La Grange Ave., Essington, Pa. 19029)
Filed Aug. 31, 1967, Ser. No. 664,880
Int. Cl. B01d 9/00; C23c 13/08
U.S. Cl. 117—46                              30 Claims

ABSTRACT OF THE DISCLOSURE

Metal clad crystal whiskers or fibers. Whisker-making apparatus which is self-cleaning. Method and apparatus for growing carbon whiskers from methane. Whisker-growing apparatus including a thimble having a bushing through which the crystal fibers are drawn downwardly. An electrostatic charge separating the ends of the growing whiskers. Cracking methane in a reaction chamber and depositing the carbon on the growing ends of the whiskers and recycling the hydrogen. Introducing hot air into the reaction chamber and using the exhaust gases from the reaction chamber to heat stones which are used in heating the hot air. Cooling the bottom of a crystal producing furnace by introducing a cool vapor mixture into the bottom and recycling the hydrogen. A method of growing whiskers by crystallization comprising electrostatically separating the ends of a plurality of growing whiskers and supporting the whiskers upright in a bunch, drawing the whiskers together at a distance from their ends to form a strand, drawing the whisker strand downwardly, and drawing a plurality of such whisker bunches and positioning them side by side so that the whiskers of adjacent bunches contact each other and limit the spreading out of the whiskers. Introducing a vapor mixture into a reaction zone containing whiskers, and crystallizing the whisker to deposit whisker material on the ends of the whiskers. Introducing pre-heated gas into the reaction chamber. Depositing metal on the growing fibers by decomposing a gaseous metal carbonyl or similar reaction.

CROSS-REFERENCES TO RELATED APPLICATIONS

My patent application Ser. No. 480,918, filed Aug. 19, 1965, also relates to crystalline whiskers and is incorporated herein by reference.

BACKGROUND OF THE INVENTION

This invention relates to whiskers of crystal, and more particularly concerns improvements in method and apparatus for growing crystalline whiskers from a vapor phase.

Crystalline structures have a strength which is astonishingly high when the structure is free from stress-concentrating faults, dislocations, notches, etc. However, it is difficult to grow this high strength crystalline material.

SUMMARY OF THE INVENTION

Method and apparatus for growing crystal whiskers. Electrostatically separating ends of a plurality of growing whiskers and supporting the whiskers upright in a bunch. Drawing a whisker strand downwardly. Positioning the whisker bunches so that the whiskers of adjacent bunches contact each other and limit the spreading out of the whiskers. Introducing a vapor mixture to deposit whisker material on the ends of whiskers in the reaction zone. Creating a temperature gradient in the reaction zone. Introducing a vapor mixture of whisker material into a reaction zone, introducing a gaseous metal mixture into said zone, crystallizing the whisker mixture to form whiskers, and depositing metal from the gaseous metal mixture onto the whiskers. Forming the metal clad whiskers into an element of desired shape, heating the elements so that the metal melts and enmeshes the whiskers, and cooling the element so that the metal hardens and holds the whiskers together. Metal clad whiskers sintered together.

It is an object of this invention to provide a method and apparatus for growing long, needle-like linear crystals which are technically known as "whiskers" or "fibers."

It is another object of this invention to provide such method and apparatus which is an improvement over previous devices and methods. It is another object to provide metal-clad whiskers and whisker elements.

It is another object to provide whisker making apparatus which is self-cleaning.

It is another object to provide method and apparatus for growing carbon whiskers from methane, $CH_4$.

BRIEF DESCRIPTION OF THE DRAWINGS

Other objects and advantages of this invention, including its simplicity and economy, as well as the ease with which it may be adapted to existing equipment, will further become apparent hereinafter and in the drawings, in which.

Figure 1:
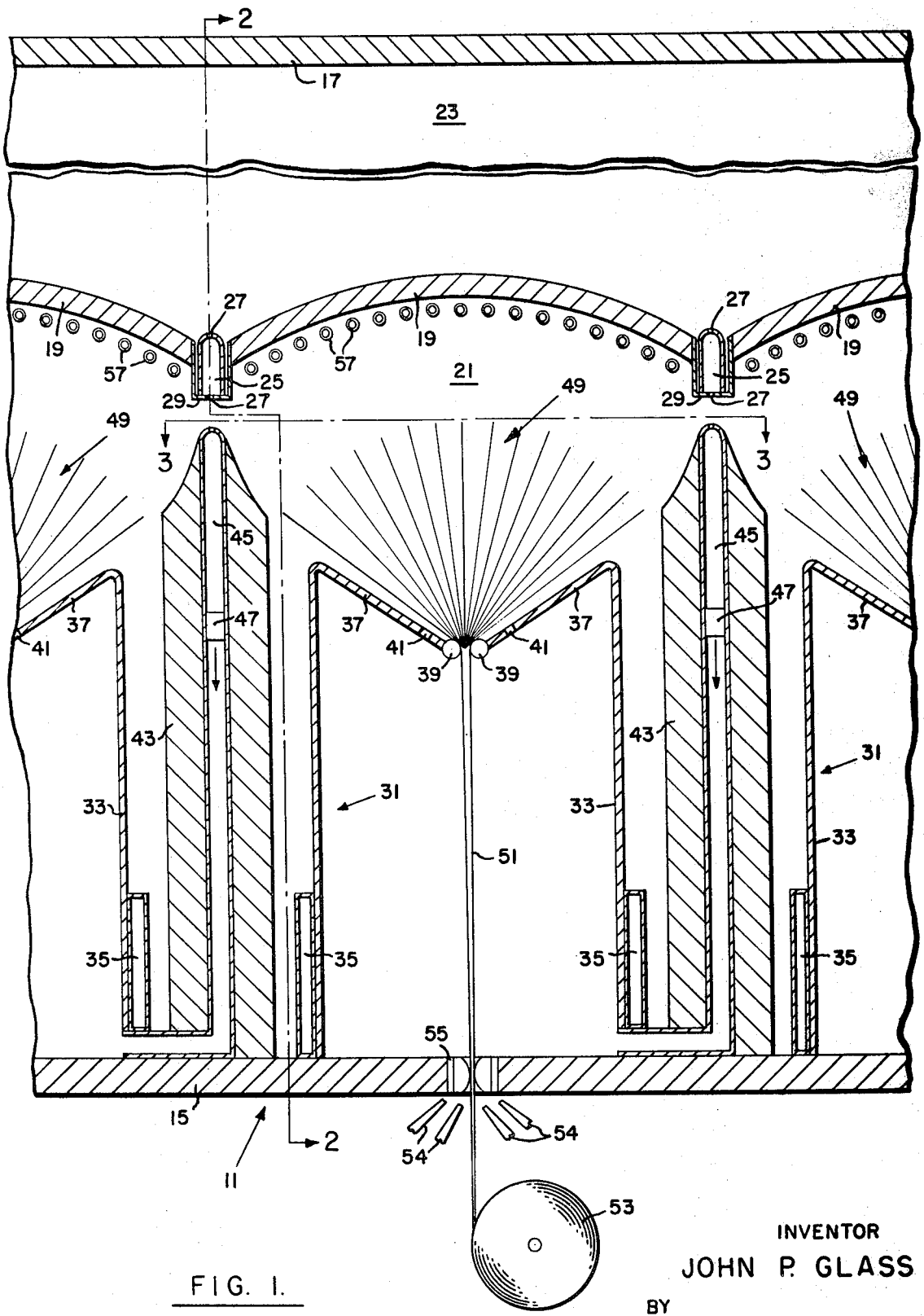
FIG. 1 is a view in vertical section of apparatus for growing whiskers, constructed in accordance with this invention.
Figure 2:
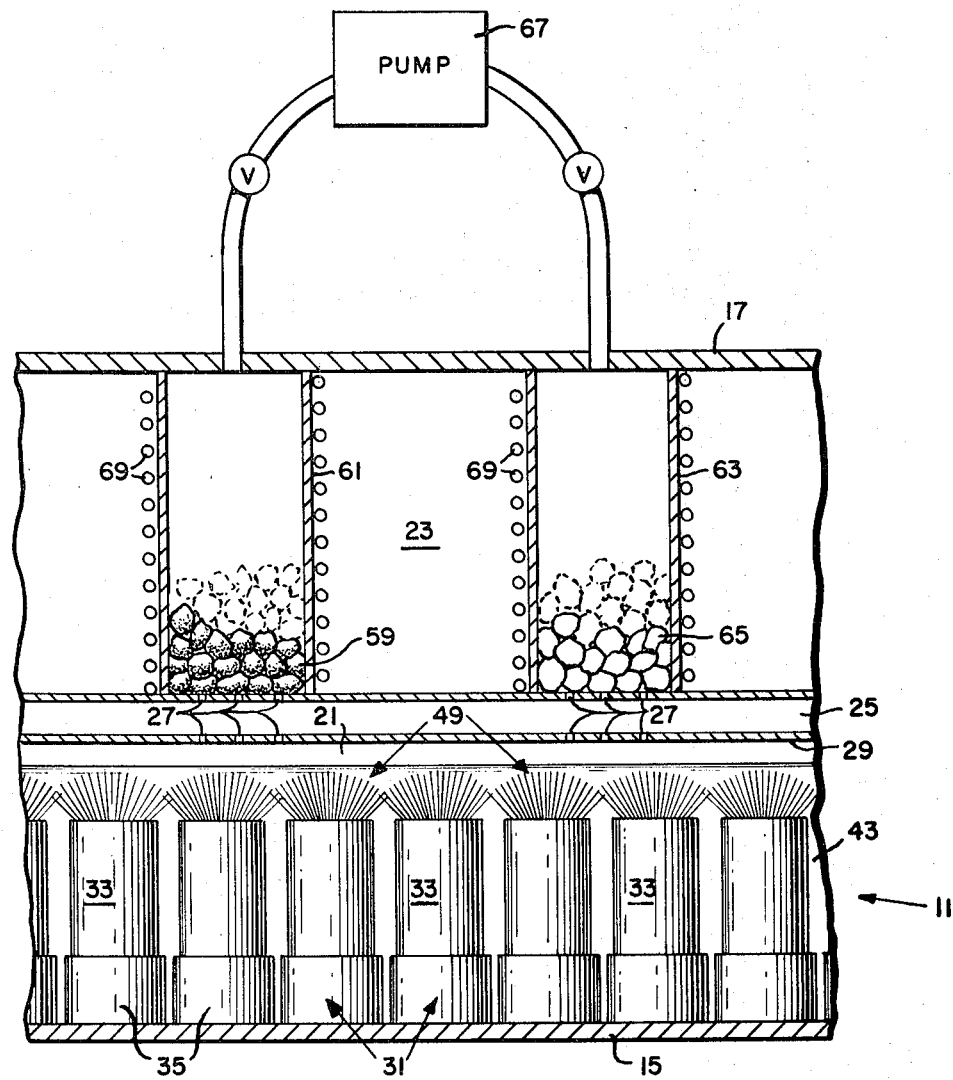
FIG. 2 is a view in vertical section taken as indicated by the lines and arrows 2—2 in FIG. 1.
Figure 3:
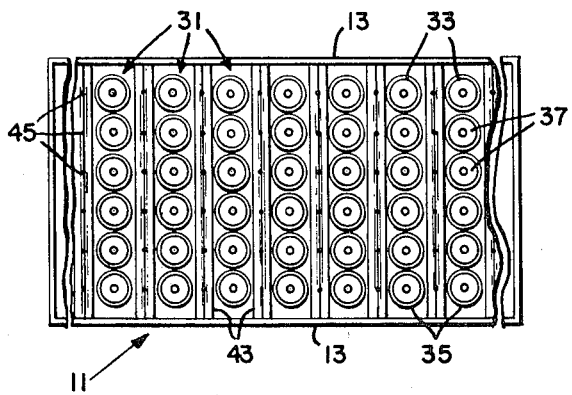
FIG. 3 is a view in horizontal section taken as indicated by the lines and arrows 3—3 in FIG. 1, but with the whiskers removed in order to show the construction of the apparatus.

Although specific terms are used in the following description for clarity, these terms are intended to refer only to the structures shown in the drawings and are not intended to define or limit the scope of the invention.

DESCRIPTION OF THE PREFERRED EMBODIMENTS

Turning now to the specific embodiment of the invention selected for illustration in the drawings, there is shown apparatus for growing whiskers by crytsallization from a vapor which includes a furnace 11 having side walls 13, bottom wall 15, top wall 17, and a partition wall 19 which divides the interior of furnace 11 into a reaction chamber 21 and an upper chamber 23.

Partition wall 19 includes a partition member 25 which is hollow and has ports 27 that allow passage of air and gases between chambers 21 and 23.

Partition member 25 has an electrostatic charge impressed thereon and is supported on non-conductive edges 29 so that the electrostatic charge is not dissipated.

A plurality of thimbles 31 extend upwardly from bottom wall 15, and may be made of a heat conducting metal such as aluminum. Thimble 31 includes a cylindrical portion 33 which has cooling means at its bottom such as water jacket 35.

Top portion 37 of thimble 31 extends downwardly and inwardly to a bushing 39 made of smooth material. Ports 41 are positioned adjacent to bushing 39.

Upright partition walls 43 extend between rows of thimbles 31 and contain an exit tube 45 having a fan or blower 47 therein for permitting the escape of exhaust gases from reaction chamber 21 and for recirculating those exhaust gases.

A bunch 49 of growing whiskers is supported upright in reaction chamber 21 by the electrostatic charge from partition member 25, and the electrostatic charge also separates the ends of the growing whiskers so that they are prepared to receive further deposits of whisker material. Bushing 39 draws the whiskers together at a distance from the growing ends to form a strand 51 of whiskers which is withdrawn from the furnace by a reel 53.

By drawing the fiber strand 51 downwardly, the furnace 11 becomes self-cleaning. In previous furnaces, in which the fiber strand was drawn upwardly, there was a tendency to leave trash in the bottom of the furnace. This trash was created by independent nucleation in the furnace which grew stray fibers that were not formed into the strand and withdrawn. Such trash or stray fibers had to be vaporized and cleaned out periodically. In the present invention, conditions for profuse nucleation may be used, and the trash products of any independent nucleation is withdrawn automatically.

By positioning bunches 49 close together in side-by-side relationship, the fibers are prevented from spreading out so much because the whiskers of adjacent bunches 49 contact each other. Accordingly, the angle of the whiskers at exit bushing 39 is less extreme, i.e., there is less of a bend to the exiting fibers at exit bushing 39.

A vapor mixture is introduced into the interior of thimble 31 from nozzles 54 through a conduit 55. The cooling means, water jacket 35 at the lower end of thimbles 31, cools the incoming vapor mixture which is heated as it passes upwardly through thimble 31 and passes into reaction chamber 21 through bushing 39 and ports 41. The vapor mixture has been introduced into the interior of thimble 31 under a slight pressure. The feed mixture diffuses upwardly through the electrostatically spread growing fibers of bunch 49 until it reaches a high enough temperature so that the crystallization reaction takes place.

In the case of methane, it cracks at about 700–900 degrees C. and carbon is deposited on the growing ends of the whiskers in the bunch 49, releasing the hydrogen into reaction chamber 21. The hydrogen escapes through exit tube 45 and is recycled downwardly by blower 47 and reintroduced into the interior of thimble 31. The escaping hydrogen has twice the volume of the incoming methane since the $CH_4$ cracks to $C+2H_2$. The recycling of the hydrogen assists in growing crystals of the desired strength characteristics, since if the proportion of methane in the vapor mixture is too rich, a sooty, weak fiber is formed. Care must also be taken to see that the proportion of methane is not too little, because if too much hydrogen is present in reaction chamber 21, the growth of whiskers is needlessly impeded.

Heating means, such as electrical elements 57 are located near the top of reaction chamber 21 so as to create therein a hot section at the top of the chamber and a comparatively cool section at the bottom. The vapor mixture is introduced into reaction chamber 21 through the cool section from whence it passes to the hot section where the crystallization takes place.

To assist in maintaining a high temperature in reaction chamber 21, about 1,000° C., hot air is introduced into the chamber through partition member 25. The air is preheated in upper chamber 23 by passing it through hot stones 59 in sub-chamber 61 of upper chamber 23. At the same time, hot exhaust gases from reaction chamber 21 pass through ports 27 of partition member 25 into sub-chamber 63 and heat the stones 65 therein. When the stones 59 cool and the stones 65 grow hot, the incoming air is switched from chamber 61 to chamber 63 where the stones 65 preheat the air, and the hot exhaust gases are switched from chamber 63 to chamber 61 to preheat the stones 59. Pump 67 is provided with valve means to accomplish this switching of incoming air.

When the furnace is originally started, electric heating elements 69 are used to heat the stones 59, 65.

The heat from upper chamber 23 travels downwardly through partition member 25 into reaction chamber 21, then travels to the growing tips or ends of the fiber bunches 49, and then travels to the thimbles 31 and downwardly along the thimble cylindrical portion 33. The principal cooling in furnace 11 is provided by the cool vapor mixture being introduced into the bottom of the thimble 31 and then being passed into the bottom of reaction chamber 21 through bushing 39 and ports 41. However, some cooling is provided by metal conduction down the cylindrical portion 33 of thimbles 31. Also, some cooling is provided by the recycling of the hydrogen and introducing it into the bottom of thimble 31.

It is to be noted that partition member 25 carries the electrostatic charge so that the fibers or whiskers themselves may be at ground potential, thereby avoiding the danger of the whiskers giving electrical shocks to personnel.

The method of growing whiskers by crystallization from vapor, in accordance with the present invention includes the steps of electrostatically separating ends of a plurality of growing whiskers and supporting the whiskers upright in a bunch 49, and drawing the whiskers together at a distance from their ends to form a strand 51. Other steps include drawing the whisker strand 51 downwardly, and growing a plurality of whisker bunches 49, positioning the bunches 49 side-by-side so that the whiskers of adjacent bunches contact each other and prevent the whiskers in a bunch 49 from spreading out to some extent.

Further steps include introducing a vapor mixture into a reaction zone 21 containing the whiskers, and crystallizing the mixture to deposit whisker material on the ends of the whiskers.

To grow carbon whiskers the vapor mixture may be methane, $CH_4$, and hydrogen. The vapor mixture introduced into the furnace may also contain oxygen. A preferred ratio of methane to hydrogen in the vapor mixture is in the range of 5 to 20 times as much methane as hydrogen.

The vapor mixture is introduced into reaction zone or chamber 21 under pressure, and reaction chamber 21 is divided into a cool section and a hot section, with the mixture being introduced into the cool section at the bottom of the chamber and passing upwardly into the hot section, with the crystallizing taking place in the hot section.

The method also contemplates the introduction of preheated air into reaction chamber or zone 21.

While the present invention has been described and particularly relates to the growth of carbon fibers or whiskers, it will be realized that other electrical conducting fibers may be grown such as boron carbide, silicon carbide, etc. Even fibers which are normally considered to be electrically non-conducting, such as aluminum oxide, may be grown by my method and apparatus. For example, aluminum oxide fibers may be grown by adding chromium vapor to an aluminum oxide fog in the reaction chamber to make the fibers electrically conducting. Semipermanent, even vitreous materials, may be rendered conducting by the addition of heat or by introducing additives.

In growing fibers of super-strength material which is electrically relatively non-conducting at other than high temperatures, such as in growing sapphire fibers, the sapphire fibers tend to lose their electric charge as they pass through bushings 39. This presents a real problem in electrostatically charging the growing ends of the fibers.

One solution to this problem is to add chromium to the vapor mixture to help the electrical conductivity of the fibers at lower temperatures.

Another solution is to deposit metal on the growing sapphire fibers as by decomposing a gaseous metal carbonyl. Carbon monoxide reacts with many metals to produce volatile compounds of the type formula $M_x(CO)_y$, such as $Mo(CO)_6$, $Fe(CO)_5$, $Ni(CO)_4$, $Co_2(CO)_8$, and $K_6(CO)_6$, which are known as metal carbonyls. By introducing a gaseous metal carbonyl into furnace 11, at a temperature below that required to vaporize the metal, and decomposing the carbonyl, metal clad whiskers are obtained, and this metal cladding is electrically conductive.

For example, by feeding a gaseous metal carbonyl through conduits 55 into thimbles 31 and through bushings 39 into the base of bunches 49, the gaseous metal carbonyl breaks down in reaction chamber 21 and deposits metal on the fibers at a distance from their tips so as not to interfere with fiber growth.

In addition to the electrical conductivity which the still hot metal shell gives to the fibers, it protects the fibers from abrasion as they are being pulled through the bushing 39. Moreover, the metal has been deposited on the fibers at a temperature which is below the melting point of the metal, so that furnace 11 may be operated at comparatively low temperatures.

The metal coated fiber strands may be wound into rolls, or may be placed parallel to each other and cut into rectangular mats, or may be formed into various shapes. Then the metal is sintered or fused to the fibers under heat and pressure so that the fibers are completely enmeshed and held together by the metal as by an adhesive. The fiber mat, for example, is a metal reinforced fiber mat of very high strength, much stronger than a similar mat with fibers held together by an epoxy resin. In an epoxy-fiber mat the epoxy may start to melt at about 200° C. and let the fibers come apart, but in a metal-fiber mat the metal does not start to melt until it reaches a red heat and the fibers cannot come apart until the metal starts to melt. In a metal-fiber mat in which the fiber is sapphire, the mat material is extremely strong even at extremely high temperatures.

Sapphire, an anhydrous oxide of aluminum, $Al_2O_3$, occurs naturally as the extremely hard and chemically inert mineral corundum.

The apparatus of furnace 11 and the growth of the whiskers in bunches 49 are self-regulating and the whisker growth requires very little in the way of controls.

What is claimed is:

1. A method of growing whiskers by crystallization from vapor, comprising electrostatically separating ends of a plurality of growing whiskers and supporting the whiskers upright in a bunch, and drawing the whiskers together at a distance from their ends to form a strand.

2. The method of claim 1, including drawing the whisker strand downwardly.

3. The method of claim 1, including growing a plurality of whisker bunches and positioning the bunches side-by-side so that the whiskers of adjacent bunches contact each other and prevent the whiskers in a bunch from spreading out to some extent.

4. The method of claim 1, including introducing a vapor mixture into a reaction zone containing said whiskers, and crystallizing the mixture to deposit whisker material on the ends of the whiskers.

5. The method of claim 4, wherein the mixture is introduced into the reaction zone under pressure, and the reaction zone is divided into a cool section and a hot section, the mixture being introduced into the cool section and passing to the hot section, with the crystallizing taking place in the hot section.

6. The method of claim 4, including introducing preheated air into the reaction zone.

7. The method of claim 4, wherein the mixture is methane and hydrogen, and the whisker material deposited is carbon.

8. The method of claim 7, wherein the mixture also contains oxygen.

9. The method of claim 7, wherein the ratio of methane to hydrogen in the mixture is in the range of 5 to 20 times as much methane as hydrogen.

10. A method of growing whiskers by crystallization from vapor, comprising introducing a vapor mixture into a reaction zone, crystallizing the mixture to form whiskers having growing ends, said mixture including a gaseous phase of sapphire and also including a gaseous phase of chromium, and electrostatically charging the growing ends of the whiskers.

11. A method of growing whiskers by crystallization from vapor, comprising introducing a vapor mixture of whisker material into a reaction zone, introducing a gaseous metal mixture into the reaction zone, crystallizing the whisker mixture to form whiskers, and depositing metal from the gaseous metal mixture onto the whiskers.

12. The method of claim 11, wherein the metal mixture includes a gaseous metal carbonyl, and the metal is deposited on the whiskers by decomposing the metal carbonyl.

13. The method of claim 11, wherein the metal mixture includes nickel carbonyl.

14. The method of claim 11, wherein the metal mixture includes iron carbonyl.

15. The method of claim 11, including the steps of forming the metal-clad whiskers into an element of desired shape, heating the element so that the metal melts and enmeshes the whiskers, and cooling the element so that the metal hardens and holds the whiskers together as by a hardened adhesive.

16. Apparatus for growing whiskers by crystallization from vapor, comprising electrostatic means for separating ends of a plurality of growing whiskers and supporting the whiskers upright in a bunch, and means for drawing the whiskers together at a distance from their ends to form a strand.

17. The apparatus of claim 16, including means for drawing the whisker strand downwardly.

18. The apparatus of claim 16, including a smooth bushing through which the whisker strand is pulled.

19. The apparatus of claim 16, including means for positioning a plurality of whisker bunches side-by-side so that the whiskers of adjacent bunches contact each other and prevent the whiskers in a bunch from spreading out to some extent.

20. The apparatus of claim 16, wherein said whiskers are growing in a recreation chamber, including means for introducing a vapor mixture into said reaction chamber and crystallizing the mixture to deposit whisker material on the ends of the whiskers.

21. The apparatus of claim 20, including heating means for heating the reaction chamber so as to create therein a hot section and a cool section, said vapor introducing means introducing the mixture into the cool section and passing it to the hot section where the crystallization takes place.

22. The apparatus of claim 20, including means for introducing air into the reaction chamber, and means for preheating said air.

23. The apparatus of claim 20, including means located in the bottom of the reaction chamber for admitting the vapor mixture so that it diffuses upwardly through the electrostatically-spread growing whiskers.

24. The apparatus of claim 20, including an exit conduit extending from the reaction chamber to permit the escape of exhaust gases from the chamber.

25. The apparatus of claim 24, including means for recycling the exhaust gases.

26. The apparatus of claim 20, including a partition member in the top of the reaction chamber, said partition member being electrostatically charged to separate and support the whisker bunch upright, whereby the whiskers may be at ground potential, thereby avoiding the danger of the whiskers giving electric shocks to personnel.

27. The apparatus of claim 20, including thimbles in the bottom of the reaction chamber, said thimbles containing the whisker strands.

28. The apparatus of claim 20, including an upper chamber located above the reaction chamber.

29. The apparatus of claim 28, including at least two sub-chambers in said upper chamber, said sub-chambers being filled with stones, means for conducting hot exhaust gases from the reaction chamber through one of the sub-chambers to heat the stones, and means for conducting air through the other sub-chamber containing stones which had previously been made hot by exhaust gases to thereby preheat the air before delivering it to the reaction chamber.

30. The apparatus of claim 29, including heating means for heating the stones initially.

References Cited

UNITED STATES PATENTS

| | | | |
|---|---|---|---|
| 2,338,570 | 1/1944 | Childs. | |
| 2,842,468 | 7/1958 | Brenner | 23—294 X |
| 3,060,013 | 10/1962 | Harvey. | |
| 3,378,345 | 4/1968 | Bourdeau et al. | 23—209.1 |
| 3,386,840 | 6/1968 | Gruber | 106—44 |
| 3,365,316 | 1/1968 | Kingery et al. | 106—42 |
| 3,447,952 | 6/1969 | Hertl | 106—44 X |

OTHER REFERENCES

Powell et al.: Vapor Deposition, May 10, 1966, pp. 300, 301, 305–307, 352–355 relied upon.

ALFRED L. LEAVITT, Primary Examiner

A. GRIMALDI, Assistant Examiner

U.S. Cl. X.R.

23—294, 301, 305; 117—66, 67, 93, 106, 107.2; 118—49.5